(12) United States Patent
Ardrey et al.

(10) Patent No.: US 11,645,882 B2
(45) Date of Patent: May 9, 2023

(54) AUTOMATED AREA DENIAL SYSTEM

(71) Applicant: ARP Holdings, LLC, Mount Juliet, TN (US)

(72) Inventors: Richard Ardrey, Mt. Juliet, TN (US); William L Roark, Gallatin, TN (US); Toby Persson, Joelton, TN (US)

(73) Assignee: ARP Holdings, LLC, Mount Juliet, TN (US)

( * ) Notice: Subject to any disclaimer, the term of this patent is extended or adjusted under 35 U.S.C. 154(b) by 92 days.

(21) Appl. No.: 17/121,454

(22) Filed: Dec. 14, 2020

(65) Prior Publication Data

US 2021/0185176 A1  Jun. 17, 2021

Related U.S. Application Data

(60) Provisional application No. 62/947,761, filed on Dec. 13, 2019.

(51) Int. Cl.

| | |
|---|---|
| *G07C 9/15* | (2020.01) |
| *G07C 9/00* | (2020.01) |
| *G07C 9/30* | (2020.01) |
| *H04M 11/04* | (2006.01) |
| *E05B 47/00* | (2006.01) |
| *E05B 41/00* | (2006.01) |
| *E05B 65/00* | (2006.01) |
| *E05G 1/04* | (2006.01) |
| *G08B 21/04* | (2006.01) |
| *G07C 9/10* | (2020.01) |
| *G06V 10/143* | (2022.01) |
| *G06V 40/16* | (2022.01) |

(52) U.S. Cl.
CPC .............. *G07C 9/15* (2020.01); *E05B 41/00* (2013.01); *E05B 47/0002* (2013.01); *E05B 65/0003* (2013.01); *E05G 1/04* (2013.01); *G07C 9/00182* (2013.01); *G07C 9/10* (2020.01); *G08B 21/0453* (2013.01); *G08B 21/0476* (2013.01); *H04M 11/04* (2013.01); *E05B 2047/0074* (2013.01); *G06V 10/143* (2022.01); *G06V 40/171* (2022.01); *G07C 9/00* (2013.01); *G07C 9/30* (2020.01)

(58) Field of Classification Search
CPC .................................. G07C 9/10; G07C 9/15
See application file for complete search history.

(56) References Cited

U.S. PATENT DOCUMENTS

| | | | | |
|---|---|---|---|---|
| 4,656,954 A | * | 4/1987 | Tonali | E05G 5/003 109/6 |
| 6,308,644 B1 | * | 10/2001 | Diaz | E05G 5/003 109/6 |
| 2007/0153871 A1 | * | 7/2007 | Fraden | A61B 5/015 374/121 |
| 2008/0106368 A1 | * | 5/2008 | Vitier | E04H 3/06 340/5.5 |

(Continued)

*Primary Examiner* — Kam Wan Ma
(74) *Attorney, Agent, or Firm* — Mark A. Pitchford; Eric B. Fugett; Pitchford Fugett, PLLC (57) ABSTRACT

A system and method for automatically screening anyone arriving to a facility outside of predetermined entry and exit times is provided. The automated screening system denies entry and detains anyone determined to be a threat. An operator may then take the person denied entry into custody or manually override the system to allow the person access to the facility.

19 Claims, 2 Drawing Sheets

(56) References Cited

U.S. PATENT DOCUMENTS

2008/0247609 A1* 10/2008 Feris .................... G06V 40/103
340/506
2010/0072361 A1* 3/2010 Liu ........................ G01V 8/005
250/286

\* cited by examiner

AUTOMATED AREA DENIAL SYSTEM

CROSS-REFERENCES TO RELATED APPLICATIONS

This application claims priority to and hereby incorporates by reference in its entirety U.S. Provisional Patent Application Ser. No. 62/947,761 entitled "AUTOMATED AREA DENIAL SYSTEM" filed Dec. 13, 2019.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to securing entrances to facilities. More particularly, this invention pertains to systems and methods for preventing armed individuals or diseased individuals from entering a facility.

Non-sports based school shootings are predominantly perpetrated by individuals with a grudge against a specific target or targets at the school. The targets could be other students (e.g. bullies or someone who rebuffed a romantic advance) or faculty/staff members abusing their position of power (e.g. pedophiles). The aggrieved person generally arrives to the school after classes have started rather than during 'cattle call' or 'rush hour' when school begins in the morning or ends in the afternoon. While some people have brought a weapon and carried it with them all day at school, those people appear to have done so out of fear for their personal safety and not out of a specific plan to act that particular day. That is, people who enter the school before or after class with a weapon generally carry the weapon only as a self-defense measure. In contrast, potential attackers know their specific targets will be in a predetermined location (office or seat in a classroom) at a predetermined time of the day. These attackers arrive at the predetermined time to act against those targets because they feel they are out of options and have had no success in gaining help for their predicament.

Schools today are generally in lockdown during classes. That is, all doors and windows are closed, locked, and alarm monitored. Entrances to the school need to be staffed by capable personnel continuously throughout the school day while they are open, or they are ineffective. Some schools accomplish this by keeping the front door locked and installing an intercom to the front office. This is still largely ineffective in that a potential shooter or attacker can simply lie to the administrator via the intercom regarding their need for late entry to the building. When a person does get 'buzzed in' to the building via the main door by the administrator at the intercom in the office, they are expected to swing by the office and sign in. A shooter is probably not interested in signing in, but may do so just to allay suspicion until their objective is achieved. Even if they do sign in, the person entering the school is not vetted beyond a cursory explanation for late arrival or their purpose in being at the school. Once the secured area is breached, the entire building or protected area is breached.

To keep people with ill intent and weapons out of the school, late arrivals of every kind must be physically screened, not casually questioned. This requires expensive fulltime monitoring by qualified personnel. This could be a school resource officer (SRO), but that SRO must have someone cover for them whenever they are needed elsewhere (or on break, at lunch, in the bathroom, etc.). Further, the SRO must always execute the physical screening properly and never be distracted or bored in order to have complete control of the school. Even with a handheld or walkthrough metal detector and a desk manned by an SRO, there is nothing to stop a motivated perpetrator from just shooting the SRO and going on to attack their actual intended target(s). Once the secured area is breached, everyone in the secured area or building is at risk.

Additionally, pandemics bring about certain screening requirements for individuals entering facilities. Protocols during current pandemics provide that individuals exhibiting any fever may not enter any government buildings or places of business. Protocols also require all individuals entering places of business and government buildings to wear face masks. Current procedures require manual intervention to screen individuals entering facilities for fever and face masks. Without controlled access in conjunction with manual screening, individuals can and do bypass screening. Manual screening also exposes the screener to risk of infection from an infected individual. Just as with an active shooter, once a diseased (i.e., infected) person has entered a facility, anywhere in the facility is subject to contamination with the disease.

BRIEF SUMMARY OF THE INVENTION

Aspects of the present invention provide a system and method for automatically screening anyone arriving to a facility outside of predetermined entry and exit times. The automated screening system denies entry and detains anyone determined to be a threat. An operator may then take the person into custody or manually override the system to allow the person access to the facility. The facility may be a school, entertainment venue, amphitheater, or any other area for which automated, secured entry is desired. The system may be permanently installed or mobile (e.g., trailer mounted). The system may be set to screen everyone entering a facility at any time instead of just during predetermined times.

In operation, the only way into a locked down facility (e.g., school) is through the automated area denial system. The automated area denial system requires each person entering through the monitored entrance to successfully pass through a contraband detector (e.g. metal detector or backscatter x-ray) before they are allowed into the facility (e.g., school). The automated area denial system is bullet-resistant and keeps everyone safe until people entering the facility through the system are properly vetted. Only when the contraband detector triggers an alarm (and the system automatically locks in the potential suspect) is any human or operator intervention required. The operator (e.g., an SRO, security personnel, or facility administrator) performs an in-person inspection on anyone detained by the system from a safe position outside of the system and determines if the trapped person should be released into the facility or held in the system until law enforcement personnel can take the person into custody. When set up for pandemic screening, the contraband detector may also include a thermometer (e.g., IR thermometer) or thermal camera to determine the person's temperature (i.e., determine whether the person has a fever). The contraband detector may also include a camera and image recognition system configured to determine that the person has a covered face (i.e., is wearing a face mask) before allowing the person entry to the facility.

In one aspect of the invention, an automated area denial system includes a vestibule, a front door sensor, a rear door sensor, a contraband detector, a front presence detector, a rear presence detector, and a controller. The vestibule includes a front door and a rear door. The front door provides access from outside a secured area into the vestibule when the front door is open. The vestibule and front door cooperate to prevent access from outside the secured area into the vestibule when the front door is closed. The rear door provides access from the vestibule to the secured area when the rear door is open. The vestibule and rear door cooperate to prevent access from the vestibule to the secured area when the rear door is closed. The front door sensor is configured to provide a front door signal indicative of whether the front door is open. The rear door sensor is configured to provide a rear door signal indicative of whether the rear door is open. The contraband detector divides the vestibule into a front chamber and a rear chamber such that no people or items larger than a predetermined size can pass from the front chamber to the rear chamber without inspection by the contraband detector. The contraband detector is configured to provide an alarm signal indicative of contraband having been detected by the contraband detector. The front presence detector is configured to provide a front presence signal indicative of whether a person is present in the front chamber. The rear presence detector is configured to provide a rear presence signal indicative of whether a person is present in the rear chamber. The controller is configured to receive the alarm signal, the front presence signal, the rear presence signal, the front door signal, and the rear door signal.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. The upright position of the system is considered to be installed at a secure area with a perimeter of the secure area abutting (i.e., or at least very close to) walls of the vestibule so as to prevent access to the secure area from outside the secure area except through the automated area denial system. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified. The terms "above", "below", "over", and "under" mean "having an elevation or vertical height greater or lesser than" and are not intended to imply that one object or component is directly over or under another object or component. As used herein, normal operation of the system means while the system is not detecting the alarm signal is not indicative of the contraband detector having detected contraband, or after the operator has reset the system after the alarm signal has indicated the contraband detector having detected contraband.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without operator input or prompting, whether these features, elements and/or states are included or are to be performed in any particular embodiment.

The terms "coupled" and "connected" mean at least either a direct electrical connection between the connected items or an indirect connection through one or more passive or active intermediary devices.

The term "circuit" means at least either a single component or a multiplicity of components, either active and/or passive, that are coupled together to provide a desired function.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

Figure 1:
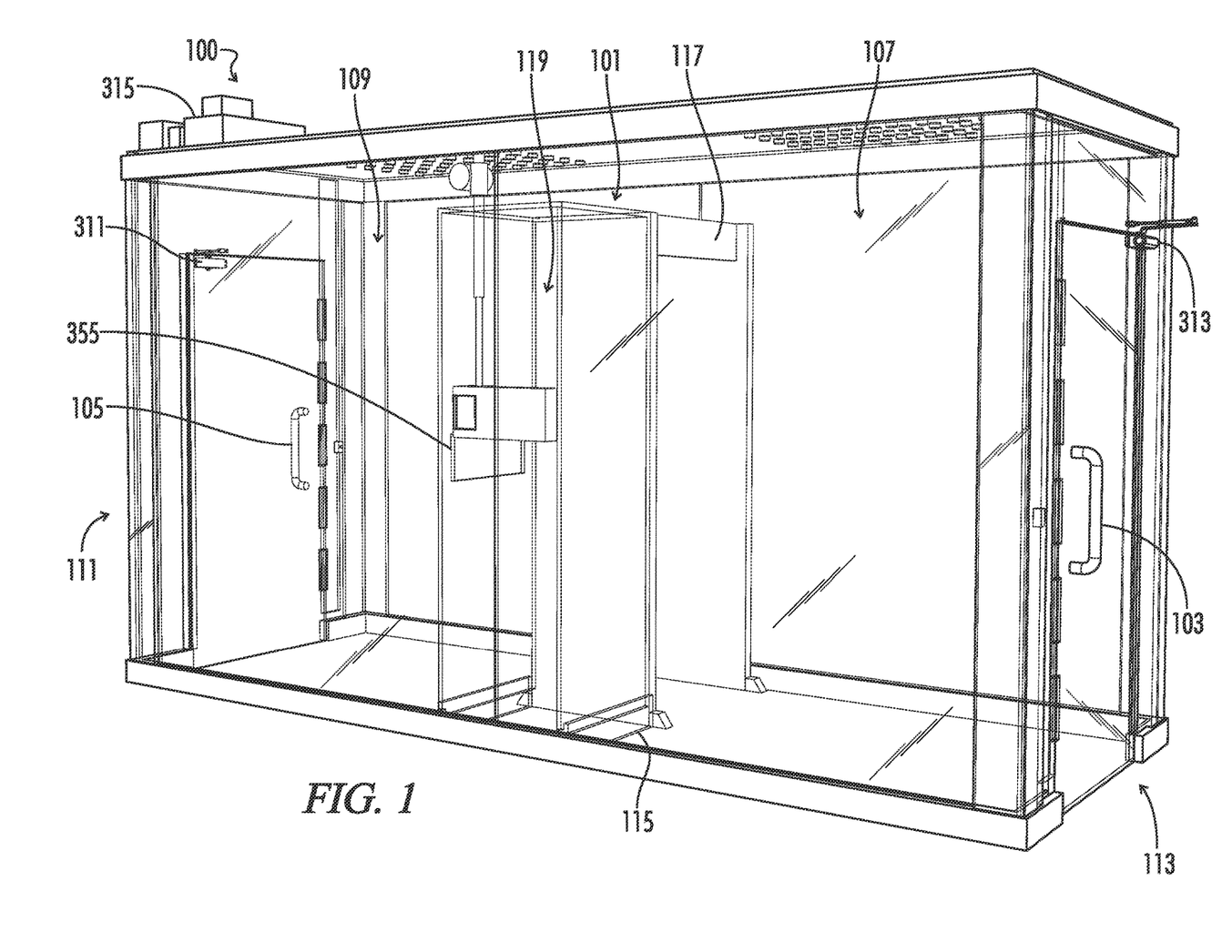
FIG. 1 is an isometric view of an automated area denial system according to one embodiment of the invention.
Figure 2:
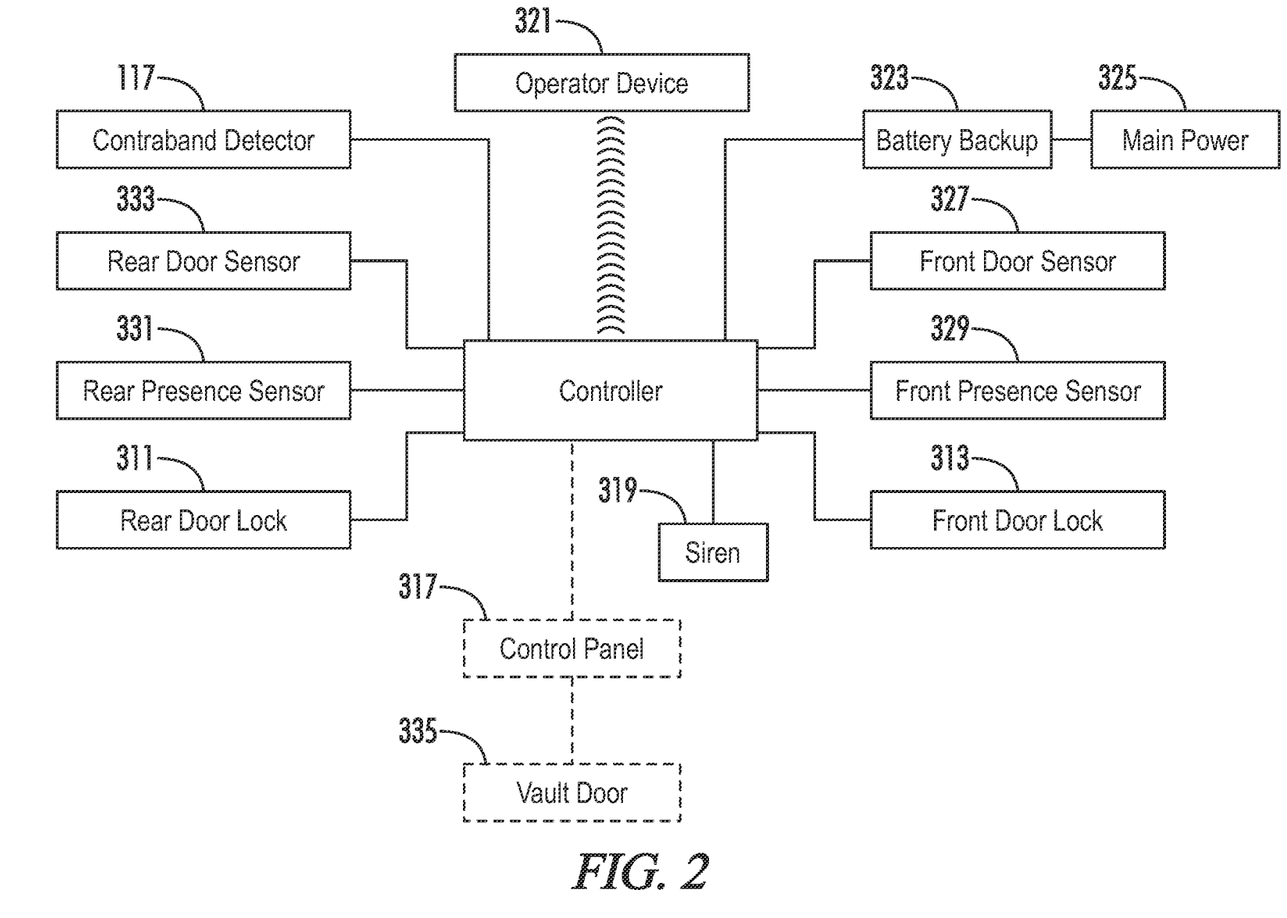
FIG. 2 is a block diagram of an automated area denial system according to one embodiment of the invention.

Referring now to FIGS. 1 and 2, the automated area denial system 100 is a semi-autonomous contraband detection system embedded within an area denial man-trap. Under normal operation, the automated area denial system 100 allows free passage of individuals into a facility or secured area 111 until contraband is detected. When contraband is detected, the individual bringing contraband into the system 100 is retained within the system 100 until an operator determines the appropriate course of action with respect to the individual.

The automated area denial system 100 includes a generally transparent, bullet-resistant, fully enclosed vestibule 101. The vestibule 101 has a man-door at opposing ends (front door 103 and rear door 105), each door featuring at least one magnetic lock and an automatic recloser. The vestibule 101 also has a generally centrally located barrier 115 dividing the vestibule 101 into front and rear chambers. The barrier 115 includes a contraband detector 117 (e.g., a walk-through metal detector or backscatter x-ray) and a barrier 115 extending between the contraband detector 117 and walls of the vestibule 101 in order to prevent an occupant from passing anything from the front chamber 107 to the rear chamber 109 without passing the item through the contraband detector 117. In one embodiment, walls (and ceiling) of the vestibule 101 are constructed of ballistic glass (i.e., bullet resistant glass). The ceiling and/or walls may include a plurality of vent holes therethrough. Panels of ballistic glass corresponding to the vent holes through the walls/ceiling of the are stood off from the wall or ceiling to prevent line of sight into the facility 111 from the vestibule 101 (i.e., prevent an occupant of the vestibule 101 from being able to shoot through the holes into the facility 111 or at an operator of the system). In one embodiment, the ceiling and floor of the vestibule 101 are considered to be walls of the vestibule 101. The ceiling and floor of the vestibule 101 may be transparent or made of opaque materials. In another embodiment, the ceiling and floor of the vestibule 101 are not considered walls of the vestibule.

In one embodiment, the system 100 also includes presence detectors in the front chamber 107 and the rear chamber 109, an operator's control/indicator panel 317, secured controls, status indicators, and a secure equipment box. The equipment box houses control circuitry, power control equipment (e.g., the controller 315 including circuit drivers and solenoids for the electro-magnetic door locks 311,313), audiovisual recording equipment, a paging system, and an alarm system (e.g., siren 319). The audiovisual devices record pertinent traffic and events within and around the vestibule 101.

In operation, the automated area denial system 100 screens individuals for contraband (e.g. firearms and knives) before allowing entry to a facility (e.g. a school building) 111. The apparatus 100 detains an occupant upon detection of potential contraband. A human operator then investigates what set off the contraband detector 117 and makes a final determination of whether to allow entry to the secured area 111, detain the occupant of the system for law enforcement, or allow the occupant to leave the area back into unsecured area 113.

If an occupant of the system 100 does not set off the contraband detector 117, the system 100 allows the occupant to exit into the secured area 111 unhindered (i.e., facility). No human operator presence is required in this 'normal' operation circumstance.

The automated area denial system 100 can accommodate and process multiple simultaneous occupants while preventing drafting, thereby keeping everyone safe. Drafting would be when a first person with no contraband opens a rear door 105 of the system 100 and a second person who does have contraband follows the first person through the rear door 105. In existing systems that allow drafting (e.g., stand alone metal detectors), an alarm sounds, but the second person has entered the facility 111 with the contraband.

In one embodiment, an automated area denial system 100 includes a vestibule 101, a front door sensor 327, a rear door sensor 333, a contraband detector 117, a front presence detector 329 a rear presence detector 331, and a controller 315. The vestibule 101 includes a front door 103 and a rear door 105. The front door 103 provides access from an unsecured area 113 outside a secured area 111 into the vestibule 101 when the front door 103 is open. The vestibule 101 and front door 103 cooperate to prevent access from the unsecured area 113 outside the secured area 111 into the vestibule 101 when the front door 103 is closed. The rear door 105 provides access from the vestibule 101 to the secured area 111 when the rear door 105 is open. The vestibule 101 and rear door 105 cooperate to prevent access from the vestibule 101 to the secured area 111 when the rear door 105 is closed. The front door sensor 327 is configured to provide a front door signal indicative of whether the front door 103 is open. The rear door sensor 333 is configured to provide a rear door signal indicative of whether the rear door 105 is open. The contraband detector 117 divides the vestibule 101 into a front chamber 107 and a rear chamber 109 such that no people or items larger than a predetermined size can pass from the front chamber 107 to the rear chamber 109 without inspection by the contraband detector 117. In one embodiment, barrier 115 is also used reduce space between the contraband detector 117 and walls of the vestibule 101. When the system 100 is installed at a secured area, a perimeter of the secured area 111 adjoins the vestibule 101 so as to prevent entry to the secured area 111 in any space between the perimeter and the vestibule 101.

The contraband detector 117 is configured to provide an alarm signal indicative of contraband having been detected by the contraband detector 117. The front presence detector 329 is configured to provide a front presence signal indicative of whether a person is present in the front chamber 107, and the rear presence detector 331 is configured to provide a rear presence signal indicative of whether a person is present in the rear chamber 109 of the vestibule 101. In one embodiment, the contraband detector 117 includes a metal detector. Any item or person passing from the front chamber 107 to the rear chamber 109 must pass through the metal detector. The metal detector provides the alarm signal in response to determining an amount of metal above a predetermined threshold having passed through the metal detector. In one embodiment, the contraband detector 117 includes a thermal camera, and the controller 315 and thermal camera cooperate to determine whether each person passing from the front chamber 107 to the rear chamber 109 has a fever and generate the alarm signal as a function of a determined fever. It is also contemplated within the scope of the claims that the thermal camera may include image processing ability in order to determine whether a person pictured by the thermal camera has a fever such that the thermal camera functions as a standalone contraband detector 117 providing the alarm signal to the controller 315. In one embodiment, the contraband detector 117 includes a camera, and the controller 315 and camera cooperate to determine whether each person passing from the front chamber 107 to the rear chamber 109 has a face mask on and generate the alarm signal as a function of determining a person passing from the front chamber 107 to the rear chamber 109 does not have a face mask on. It is also contemplated within the scope of the claims that the camera may include image processing functions in order to determine whether a person pictured by the camera as on a facemask such that the camera functions as a standalone contraband detector 117 providing the alarm signal to the controller 315. In one embodiment, the controller is configured to provide a notification to an operator as a function of at least 1 of the alarm signal, the front presence signal, the rear presence signal, the front door signal, and the rear door signal. In one embodiment, providing the notification includes transmitting at least 1 of an email, a short messaging system (SMS) message, or a radiofrequency transmission from the controller 3152 an electronic device 321 associated with the operator via a corresponding communications medium. In one embodiment, the controller 315 is further configured to lock the front door 103 via the front door lock signal and the rear door 105 via the rear door lock signal in response to the alarm signal indicating that the contraband detector 117 has detected contraband. The controller also provides a notification to an operator in response to the alarm signal indicating that the contraband detector 117 has detected contraband. In one embodiment, the system 100 further includes a siren 319 configured to produce an audible alert when activated. Controller 315 is configured to activate or actuate the siren 319 when the controller 315 determines via the front door signal and the rear door signal that the front door 103 and the rear door 105 are both open. In one embodiment, the controller 315 is further configured to provide a notification to an operator when the controller 315 determines via the front door signal and the rear door signal that the front door 103 and the rear door 105 are both open.

The controller 315 is configured to receive the alarm signal, the front presence signal, the rear presence signal, the front door signal, and the rear door signal. In one embodiment, the system 100 further includes a front door lock 313 configured to selectively lock the front door 103 closed in response to a front door lock signal from the controller 315. In another embodiment, the system 100 further includes a rear door lock 311 configured to selectively lock the rear door 105 in response to a rear door lock signal from the controller 315. In one embodiment, the controller 315 is further configured to selectively lock at least 1 of the front door 103 via the front door lock signal or the rear door 105 via the rear door lock signal as a function of at least 1 of the alarm signal, the front presence signal, the rear presence signal, the front door signal, and the rear door signal.

In one embodiment, the system 100 is further configured to receive power from a power main 325 during normal operation. The system 100 includes a battery backup 323 connected to the controller 315. When the system 100 ceases to receive power from the power main 325 during normal operation, the controller 315 receives power from the battery backup 323, locks the front door 103 via the front door lock signal, and sends a notification to an operator via a communications medium corresponding to the notification.

In one embodiment, during normal operation, the controller 315 is configured to lock the rear door 105 via the rear door lock signal and maintain the rear door lock 311 in a locked configuration via the rear door lock signal while the front residence signal indicates the presence of a person in the front chamber 107 of the vestibule 101. The controller 315 will only unlock the rear door lock 311 via the rear door lock signal in the front presence signal does not indicate that a person is in the front chamber 107 of the vestibule 101 and the front door signal indicates that the front door 103 is closed (i.e., not open). In one embodiment, the controller 315 is configured to unlock the rear door lock 311 via the rear door lock signal when the front presence signal does not indicate that person is in the front chamber 107 of the vestibule 101, the front door signal indicates that the front door 103 is closed, and the rear presence signal indicates that a person is in the rear chamber 109. In this way, controller 315 operates without an exit button at the rear door 105. In one embodiment, the front door lock 313 and the rear door lock 311 are electromagnetic locks configured to lock when not receiving electrical power.

In one embodiment, the system 100 further includes a vault 119 including a vault door 335. The fault door 335 is configured to selectively provide access between an interior of the vault 119 and an interior of the vestibule 101 such that the vault 119 forms a lockable receptacle configured to receive contraband from the vestibule 101.

In one embodiment, the system 100 further includes a control panel 317 configured to prevent use of the control panel 317 other than by an operator of the system 100. In one embodiment, the control panel 317 includes a vault door control, a reset control, and at least 1 of a front door override or a rear door override. The vault door control is configured to selectively lock and unlock the vault door 335 of the vault 119 of the system 100. The vault 119 includes the vault door 335 configured to selectively provide access in an interior of the vault 119 and an interior of the vestibule 101 such that the vault 119 forms a lockable receptacle configured to receive contraband from the vestibule 101. The reset control is configured to return the system 100 to normal operation after the system 100 has had at least 1 of the alarm signal having indicated that the contraband detector 117 has detected contraband or the siren 319 of the system 100 has been activated in response to the controller 315 determining via the front door signal and the rear door signal that the front door 103 and the rear door 105 were both open at the same time. The front door override is configured to unlock the front door lock 313 after the system 100 has had at least 1 of the alarm signal having indicated that the contraband detector 117 has detected contraband or the siren 319 of the system 100 has been activated in response to the controller 315 determining via the front door signal and the rear door signal that the front door 103 and the rear door 105 were both open at the same time and before the system 100 has been returned to normal operation. The rear door override is configured to unlock the rear door lock 311 after the system 100 has had at least 1 of the alarm signal having indicated that the contraband detector 117 has detected contraband or the siren 319 of the system 100 has been activated in response to the controller 315 determining via the front door signal and the rear door signal that the front door 103 and the rear door 105 were both open at the same time and before the system 100 has been returned to normal operation. In one embodiment, the control panel 317 requires a key, access code, or login credentials to be supplied to the system 100 in order to allow use of the control panel 317. Use of the control panel 317 includes actuating at least 1 of the vault door control, the reset control, the front door override, or the rear door override. In one embodiment, the control panel 317 is a physical panel of buttons or switches adjacent an outside wall of the vestibule 101, and a physical key or access code must be supplied keypad on the control panel 317 before buttons corresponding to each of the controls will perform their functions. In another embodiment, the control panel 317 is built into the electronic device 321 associated with the operator such that the operator must be logged into the electronic device 321 (e.g., smart phone) to access the control panel 317.

The automated area denial system 100 records and archives pertinent activities in and around itself. In one embodiment, the plurality of cameras and microphones in the system 100 are attached to a digital video recording system (DVR) and when the system alarms, the DVR saves recordings from a predetermined period of time prior to the alarm condition. The system 100 allows remote monitoring but not remote operation. In one embodiment, the system 100 intentionally prevents remote operation. Physical presence of an operator at the system 100 is required to address any alarm condition. This prevents staff from remotely and carelessly allowing access to the facility 111 for people they know. It requires staff or an operator to approach the vestibule 101 and person and inspect the situation. It also prevents the system 100 from being hacked and overridden remotely.

The automated area denial system 100 alarms audibly via a siren 319 when a dangerous condition is detected. One dangerous condition or alarm condition occurs if the entry and exit doors (i.e., front 103 and rear 105 doors) are open simultaneously thereby allowing unregulated throughput. Another dangerous alarm condition actuating the siren 319 occurs (and the front and rear doors are automatically locked) if the exit door (rear door 109) is open and the contraband detector 117 alarms (detects contraband).

Upon a power failure (i.e., failure of main power 325), the system 100 notifies an operator (e.g., produces an audible tone or sends a text message), but the system 100 continues to operate normally for a period of time using a battery backup unit 323. Operational protocol is for the operator to lock the external school door (i.e., entry door or front door 103), process anyone caught in the box (i.e., vestibule 101), and then shut off the system 100. This must be done as soon as feasible since once backup power is exhausted throughput is no longer regulated and secure. Alternatively, the doors lock when power is cut to the system 100 after the battery backup 323 is exhausted so anyone in the vestibule 1010 would be temporarily confined therein until power 325 is restored to the system 100.

In one embodiment, the system 100 has a control panel 317 with several inputs—power on/off, release exit door lock, and lock/unlock vault door.

The automated area denial system 100 employs various sensors to detect non-allowable conditions of passage (i.e., alarm conditions). These conditions include the detected presence of contraband or and the presence of multiple occupants under certain circumstances. The automated area denial system determines the following system variables via the appropriate sensors throughout the vestibule 101:

Front door status (open or closed)
Front door lock status (locked or unlocked)
Person(s) present in front chamber 107
Person(s) present in rear chamber 109
Manual Exit button status
Rear door status (open or closed)
Rear door lock status (locked or unlocked)
Contraband detector 117 status (on or off)
Recording system status (on or off)

Presence detectors in the front and rear chambers are designed with a tamper detection circuit. The automated area denial system 100 locks up (Entry and Exit Doors) and refuses to allow passage when the tamper detection circuits activate. In one embodiment, the presence detectors 329, 331 are pressure sensors.

The Automated area denial system 100 includes backup power (e.g., a battery backup system 323) to maintain continuous operation (especially lock power) during power fluctuations, brownouts, and power failures.

Setting off the contraband detector 117 (CD) constitutes probable cause to detain the occupant(s).

A Vault Key is intended to be LE-held since that is the mechanism by which evidence and dangerous contraband (e.g. weapons) is taken into custody. The vault key may be held by the SRO. The vault key may be a physical key, access code, or login credentials and may be received by the system 100 at the control panel 317, vault door 335, or via a user interface of a device 321 associated with an operator of the system 100. A physical vestibule key may also be held by the SRO which allows the SRO to manually open the vestibule 101 without utilizing the control panel 317 of the system 100 (e.g., such as when main power 325 to the system 100 has been lost and battery backup 323 has been exhausted).

Automated area denial system 100 records 24/7 (while powered up) and to allow identification of all actors involved in any incident as well as their specific actions. However, the system 100 does not require individuals to be tagged/identified. E.g. RFID chip, access card, code, key, electronic handshake process, no explicit authorization required. Individuals are identified after an incident occurs via the recorded audio and video. Automated area denial system 100 does not track individuals.

Persons in the Front chamber 107 of the Automated area denial system 100 are considered to be untrustworthy—"dirty". The system 100 does not know if they are carrying contraband or not. Even if they have successfully passed through the CD 117 and then turned right around and returned to the front chamber 107 they are still considered dirty because the original person may switch out with another un-vetted person still in the front chamber 107 since the controller 315 does not lock the front door 103 in response to someone passing from the rear chamber 109 to the front chamber 107.

Persons in the Rear chamber 109 are considered vetted and therefore trustworthy—"clean"—as long as the CD 117 has not triggered an alarm when they passed through the CD 117. This is why the system 100 requires the Front chamber 107 to be empty before the controller 315 locks the front (entry) door 103 and unlocks the rear (exit) door 105.

In one embodiment, the CD 117 operates independent from the rest of Automated area denial system 110; it merely informs Automated area denial system 100 (via an alarm signal) when contraband is detected. The CD alarms in response to contraband whether or not the Entry Door 103 or Exit Door 105 is open and/or locked, and the controller 315 locks the front and rear doors 103,105 in response.

The Entry and Exit Doors are interlocked (via the system controller 315) to prevent them both being open at the same time as this would allow unregulated, unvetted throughput, allowing the secured area to be compromised. Should that occur, an independent (and very loud) siren 319 sounds as this is a system fault condition.

The Front chamber presence detector 329 and its associated delay timer preempt any signal to unlock the Exit door 105. That is, if the front chamber 107 is occupied, the controller 315 will not unlock the rear door 105. This prevents a vetted person from holding open the Exit Door 105 for an unvetted dirty person waiting in the front chamber 107. Without this interlock, the alarm on the system 100 would sound when the dirty person traversed the CD 117, but the person (now known to be dirty, i.e., in possession of contraband, following the CD setting the alarm and sounding an alarm) has now penetrated the secured area 111 (e.g., school).

In one embodiment, the Rear chamber presence detector 331 functions as a convenience to the occupant. If the occupant is eligible to leave, detecting no occupant in the front chamber 107 combined with a presence in the rear chamber 109, triggers the controller 315 to lock the Front Door 103 and unlock the Rear Door 105 so the occupant does not need to manually press an Exit Button in the rear chamber 109 (e.g. their hands are full). In one embodiment, the rear presence detector 331 is such an exit button on a wall of the vestibule 101 next to the rear door 105.

Typical Operation: Person(s) enter Automated area denial system 100, transit the CD 117 and exit automated area denial system 100. The Entry Door 103 must close (and lock) before the Exit Door 105 may unlock and open. The Front Door 103 automatically locks when the Exit Door 105 is requested to unlock. All persons in the system (i.e., in the vestibule 101) must successfully transit the CD 117 before the Exit Door 105 may unlock or open without an alarm or siren being activated by the controller 315.

Alarm Condition (contraband detected): Entry and Exit Door locks 313, 311 are locked and remain so until manually released by the Operator (e.g., SRO). The detection of potential contraband is sufficient grounds (probable cause) to detain the individual(s) in the system 100. The Operator is paged (e.g., a notification is sent to a device 321 associated with the operator) to come to the automated area denial system 100. Response time is not critical since the occupants are locked into the vestibule 101, and the vestibule 101 is bullet resistant. Since individuals are not tracked or identified (beyond being recorded), the operator must process all occupants for contraband before permitting release.

Alarm Condition (Operator processing): Operator receives page or notification and travels to the automated area denial system 100. The detainee (i.e., occupant) is instructed to 'empty pockets' for Operator review. If no contraband is seen, the detainee must go back and pass through the CD 117 again. This process repeats until the detainee can pass the CD 117 without alarm. If still no contraband, then the detainee may be released by the Operator (i.e., the operator determines that the CD alarm was a false positive). Automated area denial system 100 is then reset or rebooted for normal operation. If non-dangerous contraband is found (e.g. cellphone, trombone), the detainee can be released and processed as appropriate. The automated area denial system 100 is then reset for normal operation. If dangerous contraband is found (e.g. knife, pistol) local LE is contacted to come process the detainee.

Alarm Condition (Confiscation/Arrest): Local LE is called. Response time is not critical since detainee is safely held in automated area denial system 100 (i.e., in vestibule 101). LE arrives, opens vault 335 (i.e., unlocks door 335 from vault to vestibule 101), and instructs detainee to place the contraband in the vault. LE locks the vault door 335. Operator releases front or rear door lock and LE places detainee in custody. LE then unlocks the vault (either a door 335 from the vault to the vestibule 101, or an external vault door) and takes possession of the contraband. The operator then resets the automated area denial system 100 for normal operation.

Alarm Condition (Additional Processing): Other arrivals requesting entry to the secured area while Automated area denial system 100 is locked down may be vetted by hand.

As used herein, front door 103 may be referenced as a unit including the door itself, the front door sensor 327, and front door lock 313 such that the controller 315 interacts with the front door 103 to determine whether the front door 103 is open or closed and to lock or unlock the front door 103. Similarly, the rear door 105 may be referenced as a unit including the door itself, the rear door sensor 333, and the rear door lock 311 such that the controller 315 may interact with the rear door 105 to determine whether the rear door 105 is open or closed and to lock or unlock the rear door 105.

OPERATIONAL EXAMPLES

When the system 100 is on and waiting to screen entrants to the facility, the rear door is closed and locked, the front door is closed and unlocked, the contraband detector 117 is on, and the recording system is recording (on a DVR overwrite basis).

Case 1: Single Occupant ('SO')

If the contraband detector 117 does not determine the occupant to have contraband, the system allows the occupant to leave via the rear door unhindered (i.e., unlocks the rear door for a period of time or until a subsequent condition occurs such as a second person entering the front of the vestibule 101). When the SO moves to the rear chamber 109 of the vestibule 101, the presence detection system 331 in the rear chamber 109 detects the presence, together with no recent alarm condition of the contraband detector 117 and automatically unlocks the Exit Door 105. Alternatively, the SO may elect to press the manual Exit button on the control panel 317 to unlock the Exit Door 105 (such that no rear presence detection system is required in the system). Note that process of unlocking the Rear Door 105 requires the Entry Door 103 be closed and locked (automatic process) before the Exit Door unlocks.

If the contraband detector 117 determines that the SO has contraband and sets an alarm condition, even momentarily, the controller 315 locks the Entry (front) door 103 and will not unlock the Exit (rear) Door 105, whether automatically (i.e., in response to detecting presence in the rear chamber 109) or by occupant request (Exit Button). In this case the operator (e.g., SRO) must come investigate what set off the contraband detector 117 (CD) and determine the appropriate action to be taken. If occupant has no contraband, then the SRO releases the occupant into to the secured area. If contraband is found then the SRO can either release the occupant and confiscate the contraband (e.g. cell phone), or notify law enforcement (LE) and keep the occupant detained until LE can take the person into custody. The dangerous person and dangerous contraband remains safely in the automated area denial system 100 until LE arrives. The response time of the SRO and LE is of no critical importance as the threat is fully contained. The occupant puts the contraband into a vault 119 area of the system 100 which then makes the item inaccessible to the occupant. Upon arrival, LE opens the vault door 335 via external key switch and allows the SO to place the contraband into the vault 119 from inside the vestibule 101. LE closes (i.e., locks) the internal vault door 335 (i.e., the access point from inside the vestibule 101). LE can now disable automated area denial system's door lock(s) and safely place the SO into custody. The dangerous contraband remains safely in the vault 119 until recovery later at LE convenience. The CD 117 may include multiple devices and stages including but not limited to RFID, Raman Spectrography (i.e., explosives sniffer), Geiger counter, CCTV, metal detector, X-ray, infrared scanner, backscatter x-ray, or ultrasonic scanner.

Case 2: Multiple Occupants ('MO')

A first occupant in the automated area denial system 100 is 'O1'. A second occupant in automated area denial system 100 is 'O2'. Any subsequent occupants are treated same as O2 by the system 100.

The front door 103 of the system 100 is unlocked, and O1 can enter the vestibule 101 of the automated area denial system 100 at any time. O2 may also enter the vestibule 101. The front door 103 locks when contraband is detected or when an eligible exit request is made.

When rear door 105 is not open (and no exit request has been registered in the system controller 315 (e.g., exit button pressed or presence detected by the rear presence detector 331), and the CD 117 has not alarmed, either or both occupants may exit via the front door 103.

If both occupants successfully navigate the CD 117, then they may leave via the Exit Door 105, either by pressing the exit button, or the front presence detector 329 sensing that no one is present in the front chamber 107 of the vestibule 101 while the rear presence detector 331 is sensing that someone is present in the rear chamber 109 of the vestibule 101. That is, both occupants must successfully navigate the CD 117 for the Rear Door 105 to unlock; front chamber 107 presence detection is set up so as to require O2 to successfully navigate the CD 117 before the rear door 105 is eligible to be opened.

Either occupant can set off the CD 117, thereby detaining both of them in the vestibule 101. Both must be processed by the SRO (and LE if appropriate) before release.

If O1 has successfully navigated the CD and O2 remains in the front chamber 107 (i.e., front presence detector 329 senses a presence), the controller 315 will not unlock the rear door 105. In this case the presence of O2 in the front chamber 107 blocks any Exit Request (automatic or manual) from being effective to unlock the rear door 105. O2 must either exit via the Front Door 103 (allowing the front door to close) or successfully navigate the CD 117 before the Rear Door 105 can be unlocked by the system controller 315. In one embodiment, O2 must either exit via the Front Door 103 (allowing the front door 103 to close and lock) or successfully navigate the CD 117 before the Rear Door 105 will be unlocked by the system controller 315.

The CD 117 is set so as to detect when contraband is thrown from O2 to O1 though the CD 117 and thereby prevent circumvention by throwing contraband through the CD 117.

Upon detection of potential contraband, a paging or notification system is activated to alert the SRO to attend to the occupant. In one embodiment, notifications are sent via SMS to a phone number registered in the system controller. Email notification or radio messaging to a dedicated device 321 may also be used via appropriate communication medium.

Upon the system 100 detecting both the Entry and Exit doors 103, 105 being open at the same time (i.e., during overlapping periods of time) the controller 315 activates a very loud alarm (i.e., siren 319) and also activates the paging or notification system. This alarm (i.e., siren 319) indicates the Automated area denial system 100 is allowing unrestricted throughput. This should not happen in normal use. It could happen if the SRO turns on the Automated area denial system 100 while both doors are open. The system 100 must be powered on for this to happen.

Upon contraband detection, if the SRO deems it necessary, LE is notified to come process the contraband and detainee. LE response time is immaterial in that the detainee and contraband are secure in the Automated area denial system 100 for as long as necessary for LE to arrive. LE holds the key to operate the internal vault door 335. The contraband is placed in the vault 119 and the vault door 335 closed, securing the contraband. The perp can then be apprehended by LE via the exit door 105. The system 100 is then 're-booted' by turning it off/on returning to readiness for regular use.

It will be understood by those of skill in the art that providing data or user/operator input to the system or the user interface may be accomplished by clicking (via a mouse or touchpad) on a particular object or area of an object displayed by the user interface, or by touching the displayed object in the case of a touchscreen implementation.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media. As used herein, server is not intended to refer to a single computer or computing device. In implementation, a server will generally include an edge server, a plurality of data servers, a storage database (e.g., a large scale RAID array), and various networking components. It is contemplated that these devices or functions may also be implemented in virtual machines and spread across multiple physical computing devices.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful AUTOMATED AREA DENIAL SYSTEM it is not intended that such references be construed as limitations upon the scope of this invention except as set forth in the following claims.

What is claimed is:

1. An automated area denial system comprising:
   a vestibule comprising a front door and a rear door, wherein:
      the front door provides access from outside a secured area into the vestibule when the front door is open;
      the vestibule and front door cooperate to prevent access from outside the secured area into the vestibule when the front door is closed;
      the rear door provides access from the vestibule to the secured area when the rear door is open; and
      the vestibule and rear door cooperate to prevent access from the vestibule to the secured area when the rear door is closed;
   a front door sensor configured to provide a front door signal indicative of whether the front door is open;
   a rear door sensor configured to provide a rear door signal indicative of whether the rear door is open;
   a contraband detector dividing the vestibule into a front chamber and a rear chamber such that no people or items larger than a predetermined size can pass from the front chamber to the rear chamber without inspection by the contraband detector, wherein the contraband detector is configured to provide an alarm signal indicative of contraband having been detected by the contraband detector;
   a front presence detector configured to provide a front presence signal indicative of whether a person is present in the front chamber;
   a rear presence detector configured to provide a rear presence signal indicative of whether a person is present in the rear chamber; and
   a controller configured to receive the alarm signal, the front presence signal, the rear presence signal, the front door signal, and the rear door signal, wherein:
      the system further comprises a front door lock configured to selectively lock the front door closed in response to a front door lock signal from the controller;
      the system further comprises a rear door lock configured to selectively lock the rear door in response to a rear door lock signal from the controller;
      the controller is further configured to provide a notification to an operator as a function of at least one of the alarm signal, the front presence signal, the rear presence signal, the front door signal, and the rear door signal;
      the system is further configured to receive power from a power main during normal operation;
      the system further comprises a battery backup connected to the controller; and
      when the system ceases to receive power from the power main during normal operation the controller receives power from the battery backup, locks the front door via the front door lock signal, and sends a notification to an operator via a communications medium corresponding to the notification.

2. The system of claim 1, wherein:
   the controller is further configured to selectively lock at least one of the front door via the front door lock signal or the rear door via the rear door lock signal as a function of at least one of the alarm signal, the front presence signal, the rear presence signal, the front door signal, and the rear door signal.

3. The system of claim 1, wherein:
   the contraband detector comprises a metal detector;
   any person or item passing from the front chamber to the rear chamber must pass through the metal detector; and
   the metal detector provides the alarm signal in response to determining an amount of metal above a predetermined threshold having passed through the metal detector.

4. The system of claim 1, wherein the contraband detector comprises a thermal camera and the controller and thermal camera cooperate to determine whether each person passing from the front chamber to the rear chamber has a fever and generate the alarm signal as a function of a determined fever.

5. The system of claim 1, wherein the contraband detector comprises a camera and the controller and camera cooperate to determine whether each person passing from the front chamber to the rear chamber has a face mask on and generate the alarm signal as a function of determining a person passing from the front chamber to the rear chamber does not have a face mask on.

6. The system of claim 1, wherein when the system is installed at a secured area, a perimeter of the secured area adjoins the vestibule so as to prevent entry to the secured area in any space between the perimeter and the vestibule.

7. The system of claim 1, wherein:
   providing the notification comprises transmitting at least one of an email, a short messaging system (SMS) message, or a radio frequency transmission from the controller to an electronic device associated with the operator via a corresponding communications medium.

8. The system of claim 1, wherein:
   the controller is further configured to selectively lock the front door via the front door lock signal and the rear door via the rear door lock signal in response to the alarm signal indicating that the contraband detector has detected contraband.

9. The system of claim 1, wherein:
the controller is further configured to lock the front door via the front door lock signal and the rear door via the rear door lock signal in response to the alarm signal indicating that the contraband detector has detected contraband; and
the controller is further configured to provide a notification to an operator in response to the alarm signal indicating that the contraband detector has detected contraband.

10. The system of claim 1, wherein:
the system further comprises a siren configured to produce an audible alert when activated; and
the controller is further configured to activate the siren when the controller determines via the front door signal and the rear door signal that the front door and the rear door are both open.

11. The system of claim 1, wherein:
the system further comprises a siren configured to produce an audible alert when activated;
the controller is further configured to activate the siren when the controller determines via the front door signal and the rear door signal that the front door and the rear door are both open; and
the controller is further configured to provide a notification to an operator when the controller determines via the front door signal and the rear door signal that the front door and the rear door are both open.

12. The system of claim 1, wherein:
during normal operation, the controller is further configured to lock the rear door lock via the rear door lock signal and maintain the rear door lock in a locked configuration via the rear door lock signal while the front presence signal indicates the presence of a person in the front chamber of the vestibule, and the controller will only unlock the rear door lock via the rear door lock signal when the front presence signal does not indicate that a person is in the front chamber of the vestibule and the front door signal indicates that the front door is closed.

13. The system of claim 1, wherein:
during normal operation, the controller is further configured to:
lock the rear door lock via the rear door lock signal and maintain the rear door lock in a locked configuration via the rear door lock signal while the front presence signal indicates the presence of a person in the front chamber of the vestibule; and
unlock the rear door lock via the rear door lock signal when the front presence signal does not indicate that a person is in the front chamber of the vestibule, the front door signal indicates that the front door is closed, and the rear presence signal indicates that a person is in the rear chamber.

14. The system of claim 1, wherein:
the front door lock is an electromagnetic lock configured to lock when not receiving electrical power; and
the rear door lock is an electromagnetic lock configured to lock when not receiving electrical power.

15. The system of claim 1, wherein:
the system further comprises a vault comprising a vault door configured to selectively provide access between an interior of the vault and an interior of the vestibule such that the vault forms a lockable receptacle configured to receive contraband from the vestibule.

16. The system of claim 1, wherein:
the system further comprises a control panel configured to prevent use other than by an operator of the system, said control panel comprising:
a vault door control configured to selectively lock and unlock a vault door of a vault of the system, said vault comprising the vault door configured to selectively provide access between an interior of the vault and an interior of the vestibule such that the vault forms a lockable receptacle configured to receive contraband from the vestibule;
a reset control configured to return the system to normal operation after the system has had at least one of the alarm signal having indicate that the contraband detector has detected contraband or a siren of the system has been activated in response to the controller determining via the front door signal and the rear door signal that the front door and the rear door were both open at the same time; and
at least one of a front door override or a rear door override, said front door override configured to unlock the front door lock after the system has had at least one of the alarm signal having indicate that the contraband detector has detected contraband or a siren of the system has been activated in response to the controller determining via the front door signal and the rear door signal that the front door and the rear door were both open at the same time and before the system has been returned to normal operation, said rear door override configured to unlock the rear door lock after the system has had at least one of the alarm signal having indicate that the contraband detector has detected contraband or a siren of the system has been activated in response to the controller determining via the front door signal and the rear door signal that the front door and the rear door were both open at the same time and before the system has been returned to normal operation.

17. The system of claim 1, wherein:
the system further comprises a control panel configured to prevent use other than by an operator of the system, wherein the control panel requires a key, access code, or login credentials to be supplied to the system in order to allow use of the control panel, said use of the control panel comprising actuating at least one of a vault door control, a reset control, a front door override, or a rear door override.

18. The system of claim 1, wherein walls of the vestibule are substantially transparent.

19. An automated area denial system comprising:
a vestibule comprising a front door and a rear door, wherein:
the front door provides access from outside a secured area into the vestibule when the front door is open;
the vestibule and front door cooperate to prevent access from outside the secured area into the vestibule when the front door is closed;
the rear door provides access from the vestibule to the secured area when the rear door is open; and
the vestibule and rear door cooperate to prevent access from the vestibule to the secured area when the rear door is closed;
a front door sensor configured to provide a front door signal indicative of whether the front door is open;
a rear door sensor configured to provide a rear door signal indicative of whether the rear door is open;

a contraband detector dividing the vestibule into a front chamber and a rear chamber such that no people or items larger than a predetermined size can pass from the front chamber to the rear chamber without inspection by the contraband detector, wherein the contraband detector is configured to provide an alarm signal indicative of contraband having been detected by the contraband detector;

a front presence detector configured to provide a front presence signal indicative of whether a person is present in the front chamber;

a rear presence detector configured to provide a rear presence signal indicative of whether a person is present in the rear chamber; and a controller configured to receive the alarm signal, the front presence signal, the rear presence signal, the front door signal, and the rear door signal, wherein:

the system further comprises a front door lock configured to selectively lock the front door closed in response to a front door lock signal from the controller;

the system further comprises a rear door lock configured to selectively lock the rear door in response to a rear door lock signal from the controller;

the system further comprises a control panel configured to prevent use other than by an operator of the system, said control panel comprising:

a vault door control configured to selectively lock and unlock a vault door of a vault of the system, said vault comprising the vault door configured to selectively provide access between an interior of the vault and an interior of the vestibule such that the vault forms a lockable receptacle configured to receive contraband from the vestibule;

a reset control configured to return the system to normal operation after the system has had at least one of the alarm signal having indicate that the contraband detector has detected contraband or a siren of the system has been activated in response to the controller determining via the front door signal and the rear door signal that the front door and the rear door were both open at the same time; and at least one of a front door override or a rear door override, said front door override configured to unlock the front door lock after the system has had at least one of the alarm signal having indicate that the contraband detector has detected contraband or a siren of the system has been activated in response to the controller determining via the front door signal and the rear door signal that the front door and the rear door were both open at the same time and before the system has been returned to normal operation, said rear door override configured to unlock the rear door lock after the system has had at least one of the alarm signal having indicate that the contraband detector has detected contraband or a siren of the system has been activated in response to the controller determining via the front door signal and the rear door signal that the front door and the rear door were both open at the same time and before the system has been returned to normal operation.

* * * * *